US012200124B2

(12) United States Patent
Saleh et al.

(10) Patent No.: US 12,200,124 B2
(45) Date of Patent: Jan. 14, 2025

(54) ROTATION KEY MECHANISM FOR SECURITY ENHANCEMENT

(71) Applicant: Saudi Arabian Oil Company, Dhahran (SA)

(72) Inventors: Mashael I Saleh, Dammam (SA); Abdullah N Aldossary, Khobar (SA); John A Gwilliams, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 241 days.

(21) Appl. No.: 17/933,200

(22) Filed: Sep. 19, 2022

(65) Prior Publication Data

US 2024/0097899 A1 Mar. 21, 2024

(51) Int. Cl.
*H04L 9/16* (2006.01)
*H04L 9/32* (2006.01)

(52) U.S. Cl.
CPC ............. *H04L 9/16* (2013.01); *H04L 9/3263* (2013.01)

(58) Field of Classification Search
None
See application file for complete search history.

(56) References Cited

U.S. PATENT DOCUMENTS

| 8,964,990 | B1 | 2/2015 | Baer et al. |
| 9,369,279 | B2 | 6/2016 | Harjula et al. |
| 9,544,140 | B1 | 1/2017 | Bhatia et al. |
| 10,515,194 | B2 | 12/2019 | Koo |
| 10,587,406 | B1 | 3/2020 | Levin et al. |
| 11,044,088 | B2 | 6/2021 | Mityagin |
| 11,057,359 | B2 | 7/2021 | Wisniewski et al. |
| 11,212,079 | B2 | 12/2021 | Savalle et al. |
| 11,394,532 | B2 | 7/2022 | Horowitz et al. |
| 2014/0177829 | A1* | 6/2014 | MacMillan ........... H04L 9/0838 380/44 |
| 2017/0195303 | A1* | 7/2017 | Smith .................... H04L 9/0836 |
| 2019/0312724 | A1* | 10/2019 | Mityagin .............. H04L 63/068 |
| 2020/0186358 | A1* | 6/2020 | Capola .................. H04L 9/3228 |
| 2020/0213283 | A1 | 7/2020 | Roth et al. |
| 2021/0256098 | A1 | 8/2021 | Hensgen et al. |
| 2022/0094530 | A1* | 3/2022 | Sreeravindra ......... H04L 9/0861 |
| 2022/0393868 | A1* | 12/2022 | Mozano .............. G06F 21/6218 |
| 2023/0275756 | A1* | 8/2023 | Vishwakarma ......... H04L 9/088 380/278 |

FOREIGN PATENT DOCUMENTS

IN 201927045348 A 10/2020

* cited by examiner

*Primary Examiner* — Chris Parry
*Assistant Examiner* — Abderrahmen Chouat
(74) *Attorney, Agent, or Firm* — Leason Ellis LLP

(57) ABSTRACT

A method of establishing secure communication between a client and a server using a rotating key mechanism. The method comprises receiving a message requesting communication from a client, returning information for establishing communication to the client, including a set of cipher suites supported, receiving from the client one or more selected cipher suites from the set of cipher suites, sending rotation key mechanism attributes (RKM attributes) including a number of keys for rotation, a valid time period for each key, and a server criticality level and establishing communication between the client and server based on the rotation key mechanism attributes. The RKM attributes establish terms for key rotation when a valid time period of an active key elapses.

11 Claims, 5 Drawing Sheets

ROTATION KEY MECHANISM FOR SECURITY ENHANCEMENT

FIELD OF THE DISCLOSURE

The present disclosure concerns communication technology and security and more particularly relates to a method and system for providing a rotation key mechanism for security enhancement.

BACKGROUND OF THE DISCLOSURE

Ensuring the security of digital communications has become a vital task in the modern world. Among many other security measures, many organizations utilize data encryption to protect the contents of communication against interception. Symmetric encryption algorithms potentially have a weakness in that a single encryption key can "leak" if it is overused, allowing a potential attacker greater opportunity to reconstruct the encryption key.

To address the key leak problem, rotation of keys can be employed. In key rotation, a cryptographic key that has been used to encrypt a threshold amount of data and/or for a threshold length of time is replaced with new cryptographic key. This measure reduces the likelihood of key leaks, and also reduces the potential damage a key leak can cause.

While the benefits of key rotation are clear, key rotation requires a mechanism for both generating new keys and distributing them in a secure manner to valid users. An important variable in a key rotation mechanism is the lifetime of each key, which triggers a key rotation to a new key when the lifetime of an old key ends.

Client-server applications currently use a Tranport Layer Security (TLS) protocol to encrypt communications across a network in a way designed to prevent eavesdropping and tampering. However, current TLS protocols employ handshaking methods that use a trusted third party (TTP) and do not include a key rotation mechanism.

SUMMARY OF THE DISCLOSURE

According to one aspect, the present disclosure describes a method of establishing secure communication between a client and a server using a rotating key mechanism. The method comprises receiving a message requesting communication from a client, returning information for establishing communication to the client, including a set of cipher suites supported, receiving from the client one or more selected cipher suites from the set of cipher suites, sending rotation key mechanism attributes (RKM attributes) including a number of keys for rotation, a valid time period for each key, and a server criticality level, and establishing communication between the client and server based on the rotation key mechanism attributes. The RKM attributes establish terms for key rotation when a valid time period of an active key elapses.

In another aspect, the present disclosure provides for a non-transitory computer-readable medium storing a communication relay program including instructions that, when executed by a processor, causes a server device to receive a message requesting communication from a client, return information for establishing communication to the client, including a set of cipher suites supported, receive from the client one or more selected cipher suites from the set of cipher suites, send rotation key mechanism attributes (RKM attributes) including a number of keys for rotation, a valid time period for each key, and a server criticality level, and establish communication between the client and server based on the rotation key mechanism attributes.

These and other aspects, features, and advantages can be appreciated from the following description of certain embodiments of the invention and the accompanying drawing figures and claims.

DETAILED DESCRIPTION OF CERTAIN EMBODIMENTS OF THE DISCLOSURE

The following definitions of certain terms apply throughout the disclosure.

A "cryptographic key" is data, usually a string of numbers or letters, that when processed through a cryptographic algorithm, can encode or decode cryptographic data.

An "active key" is the sole cryptographic key that is to be used at a current time to encrypt or decrypt content to be communicated between the client and server.

An "old key" is a cryptographic key that was formerly an active key but is no longer the active key.

"Key rotation" is process in which the active key is replaced with a new key. The new key thus becomes the active key, and the replaced key becomes an old key.

The present disclosure describes a method for securing communications via a protocol for key rotation. The method and the protocol are directed to secure the communication channel between a client and a server to prevent potential security threats such as data leakage, or man-in-the middle attacks. According to embodiments of the method, the server stores a set of cryptographic keys that are intended to be provided to the client on a rotating basis. After receipt of the currently active key, the client uses the active key to encrypt communication between the client and the server. According to embodiments of the method, the server determines the number of keys, the time duration during which each key is valid, and a criticality metric for each key. Based on this information, communications proceed according to the protocol using the information provided by the server. The communication between the client and server according to the protocol continues until the client sends a notification to the server to end the communication.

Figure 1:
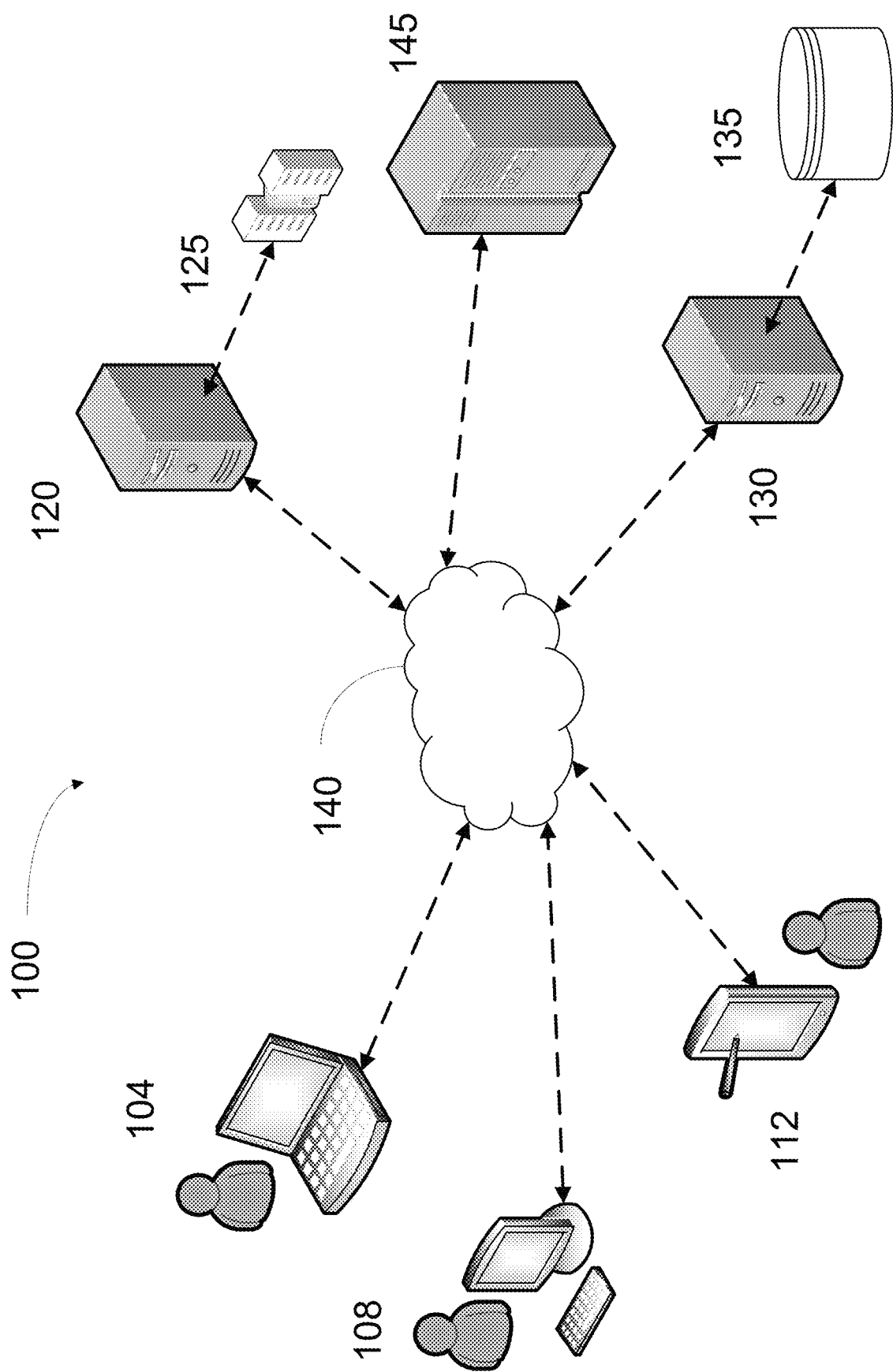
FIG. 1 is an exemplary schematic of a communication system in which a protocol for a rotating key mechanism according to the present disclosure can be implemented.

FIG. 1 is an example schematic of communication system in which a protocol for a rotating key mechanism according to the present disclosure can be implemented. The communication system 100 includes a number of electronic user devices 104, 108, 112 that can be employed by users for electronic communication. The user devices 104, 108, 112 can be personal computers of any time, smart phones, tablets, or any other electronic devices that have electronic communication and processing capability including Internet of Things (IoT) devices. The communication system also includes server devices 120, 130. Server devices can be physically dedicated or virtual machines that are configured to execute program code for providing a service to user devices 104, 108, 112 User devices 104, 108, 112 and server devices 120, 130 are connected, directly or indirectly to a communication network 140. As shown in FIG. 1, server 120 is coupled to a first database 125 and server 130 is coupled to a second database 135. This is merely illustrative and the servers 120, 130 can be coupled to any number of other storage facilities to acquire stored information for any purpose. The network 140 can be a public network, a private network, a wide or local area network, a wired or wireless network, without limitation. Users can employ electronic devices 104, 108, 112 to contact and connect to server devices 120, 130 over the network 140. During communications between a user device e.g., 104, 108, 112 and a server e.g., 120, 130, the relevant user devices is referred to as a "client" of the server. A certificate authority (CA) 145 is also connected to network 145 and can be accessed by the clients and server to authenticate the identity of communicants in the network.

Figure 2A:
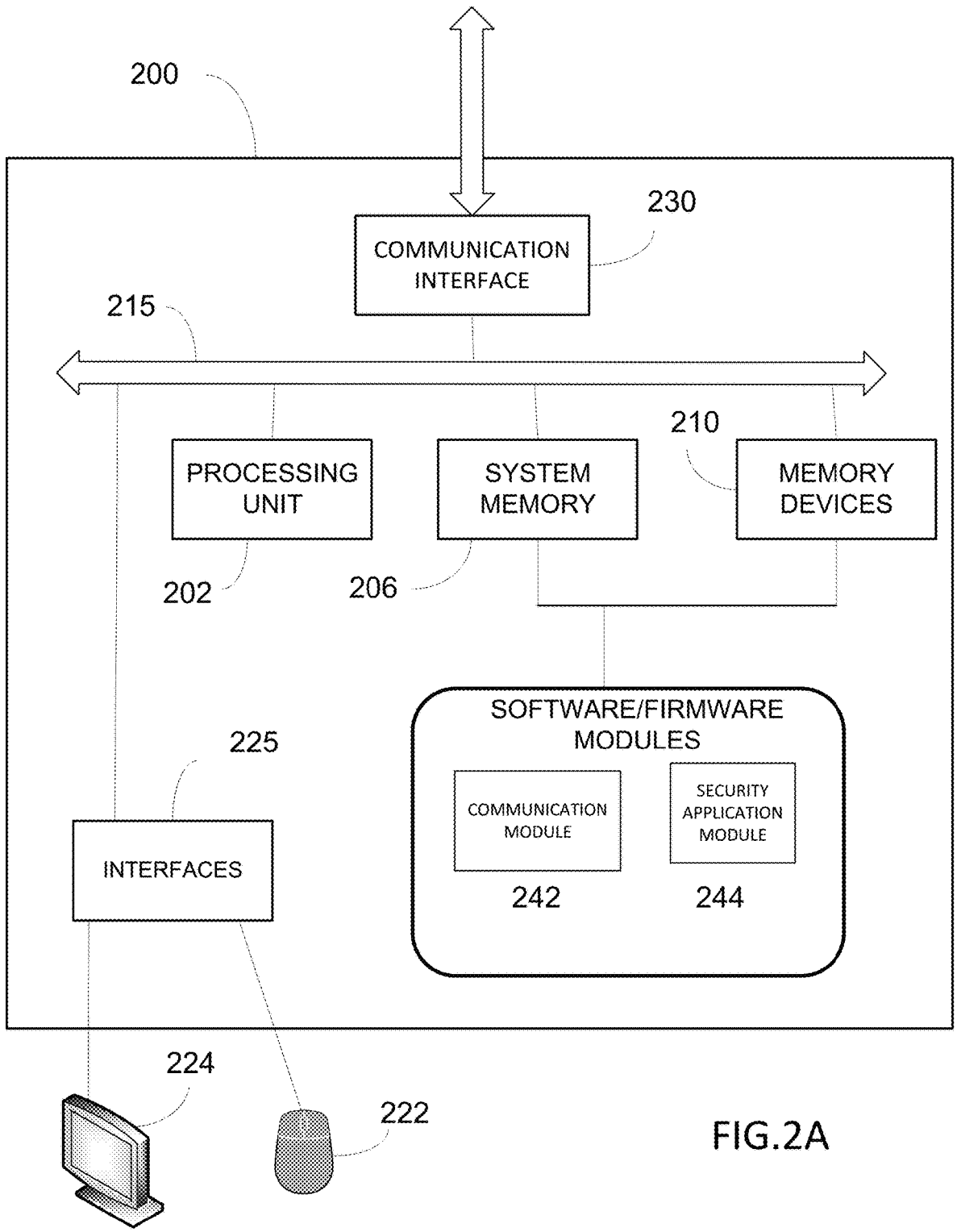
FIG. 2A is a block diagram of an exemplary client device for conducting communications using the rotating key mechanism protocol according to the present disclosure.

FIG. 2A is a schematic block diagram of a client device according to an embodiment of the present disclosure. The client device 200 includes a processing unit 202, system memory 206 and further memory device 210 coupled over a system bus 215. The processing unit 202 can include any general-purpose processor, CPU or a special-purpose processor where software instructions are incorporated into the actual processor design. The processing unit 202 can include a single core processor or can include multiple cores. System memory 206 can include local memory caches of random access memory (RAM) and read-only memory (ROM). Memory devices 210 can include hard disks, flash memory drives, and any other storage devices coupled directly to the device 200. To enable user interaction input devices 222 can represent any number of input mechanisms, such as mouse, touch-sensitive screen for gesture or graphical input, keyboard, motion input, microphone, etc. Output devices 224 can include a display monitor or speakers. The input and output devices are coupled to system buss 215 via device interfaces 225. A communications interface 230, also coupled to system bus 215, is configured to conducts and managed electronic communications between the client device and other devices, including servers, over the network.

According to the present disclosure, the client device is configured with certain capabilities, via one or more software applications or modules adapted for communicating with other devices using a secure protocol having a rotating key mechanism. A communications module 242 is adapted to employ the communications interface 230 to connect to other entities, over the network, including servers, and to transmit/receive messages according to a communication protocol. A security application module 265 stores a private key and includes program code to encrypt and decrypt message content using the private key in addition to other cipher suites. The security application module 265 includes a timer module that measures the amount of time an active key (different from the private key, as will be discussed below) has been used and can block use of the active key when a threshold amount of time has elapsed since the beginning of use of the active key.

Figure 2B:
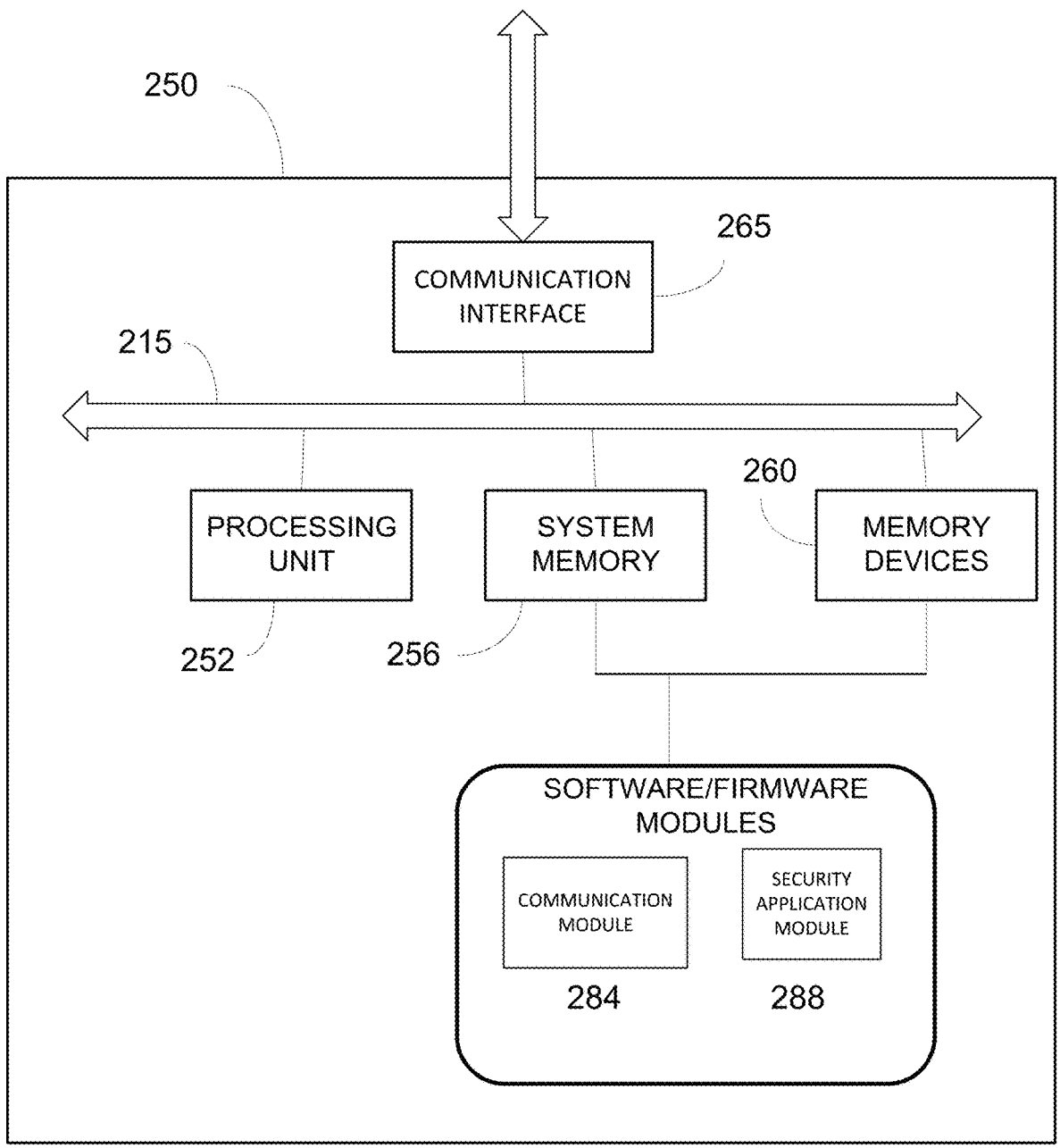
FIG. 2B is a block diagram of an exemplary server device for conducting communications using the rotating key mechanism protocol according to the present disclosure.

Referring now to FIG. 2B, an example block diagram of a server device 250 for implementing the rotating key mechanism of the present disclosure is shown. In the embodiment of FIG. 2B, the server 250 is a standalone device. However, in other embodiments the server can be implemented as a virtual machine or by a combination of processes executed over a network platform. However, to illustrate aspects of the functionality of the server, the standalone embodiment is described. The server device 250 includes a processing unit 252, system memory 256 and further memory device 260 coupled over a system bus 265. The processing unit 252 can include any general-purpose processor, CPU or a special-purpose processor where software instructions are incorporated into the actual processor design. The processing unit 252 can include a single core processor or can include multiple cores. System memory 256 can include local memory caches of random access memory (RAM) and read-only memory (ROM). Memory devices 260 can include hard disks, flash memory drives, and any other storage devices coupled directly to the device 250. A communications interface 280, also coupled to system bus 265, is configured to conducts and managed electronic communications between the client device and other devices, including servers, over the network.

The server device is configured with certain capabilities, via one or more applications or modules adapted for managing a rotating key message protocol according to the present disclosure. A communication module 284 is configured to establish communication according to a stored protocol. The communication protocol dictates the types of message sent between the server and client and their respective sequence. Communication module 284 also stores or is configured to access information and algorithms associated with communication according to the protocol. As an example, the communication module 288 can generate session ids, digital certificates and other data according to known generation methods. The security module includes encryption/decryption capability and stores or is configured to access certain information related to conducting encryption to in particular to the rotating key mechanism according to the present disclosure. For example, the security module 288 stores or is configured to access a public key of the server, cipher suites for performing encryption/decryption, as well as specific information related to key rotation referred to as rotation key mechanism attributes (RKM attributes). In certain implementations, the rotation key attributes include the number of keys to be rotated in a given session, the key rotation time (i.e., the time duration during which an active key is valid, the elapse of which triggers a key rotation), and criteria for categorizing the criticality of a communication. The RKM attributes can also include other information. The server security module 288 is configured to determine the criticality based the network entity through which communication takes place. The more public (e.g., the Internet), the lower the security and the greater need for key rotation.

Figure 3:
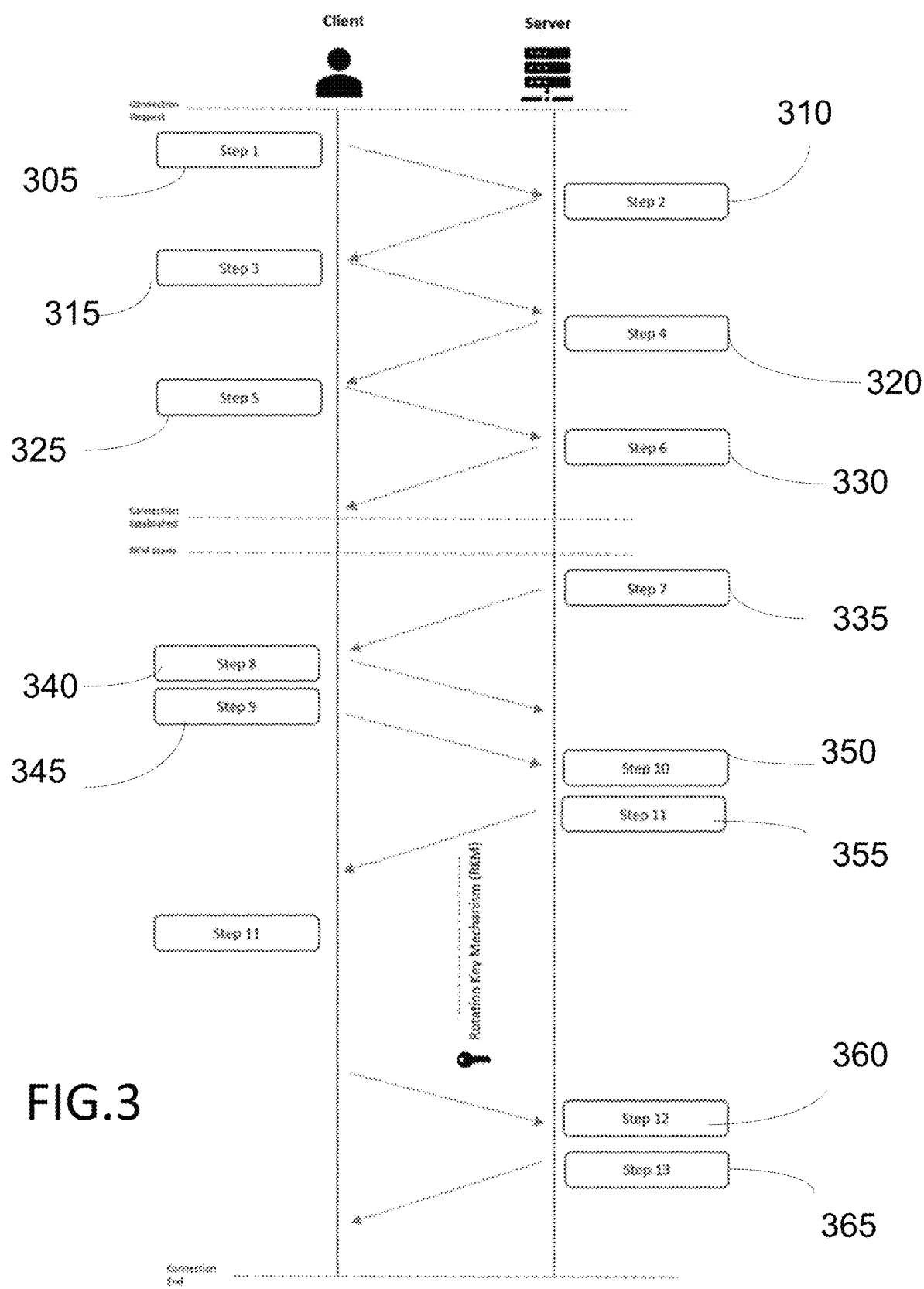
FIG. 3 is a block diagram of an exemplary client device for conducting communications using the rotating key mechanism protocol according to the present disclosure.

According to one embodiment, the steps of the protocol for a key rotation mechanism of the present disclosure are shown in the exemplary sequence diagram shown in FIG. 3. In a first step 305, a client e.g., 105 sends a "Client-Hello" message to the server e.g., 120 over network 140, which starts a negotiation between the client and server. In response, in step 310, the server 140 Server transmits a "Server-Hello" packet which includes information for establishing the session and the rotation key mechanism. In some embodiments, the information includes a session id, a digital certificate, a public key and a set of cipher suites supported for a rotation key mechanism. In some implementations, as a prelude to the following step, the client verifies the certificate received from the server by accessing a certificate authority 145. A positive communication from the certificate authority establishes trust between the client and server. In step 315 the client selects from one or two of the cipher suites received from the server and responds with a message including the selections to the server. Upon receipt of the cipher suites from the client, in step 320, the server sends back the client the set of rotation key mechanism attributes (RKM attributes). In some implementations, the attributes include the number of keys, the period during which a key is valid and at the end of which a key rotation must occur, and a system criticality categorization. In other implementations, some of this information can be left out or other information added to the attributes.

Upon receipt of the RKM attributes from the server, the client encrypts a private key associated with the client with the public key previously received from the server and in step 325, transmits the encrypted private key back to the server in a finished packet. In step 330, the server responds with a finished packet and a communication channel is considered to be established. At this point, the server can send the cryptographic keys to be rotated to the client. In step 335, the server sends the first key to the client together with the time period required for key rotation and a criticality designation, such as critical, important, medium or low. The time period included in the message is to be adjusted based on the server criticality designation. A higher criticality level decreases key rotation time while a low criticality increases key rotation time. The server criticality level is determined by the server based on the zone that the server is located on. For example, if the server is internet-facing then the criticality is high. If, on the other hand the server faces an intranet the criticality level is typically determined to be high or medium. If the server is located in an isolated network, then the criticality is determined to be low. Table 1 below provides one example of a set of relationships between criticality and rotation time according to the present disclosure. In certain implementations, in response to a criticality determination, the key rotation time is selected from a table maintained in memory.

| System Criticality | Key Rotation Time |
| --- | --- |
| Critical | 5 Minutes |
| Important | 10 Minutes |
| Medium | 30 Minutes |
| Low | 1 Hour |

In step 340, the client acknowledges the information received from the server, in terms of the number of keys, the time required to change the rotation of the keys, and the server criticality. The client uses the active key received from the server to encrypt its communication for the specified time agreed upon based on the server criticality. The encryption is a measure that is used to prevent man-in-the-middle attacks. The client can keep sending communications to the server until the specified time agreed upon elapses. During the period before the key elapses, the server decrypts communications received from the client using its public key (step 350). One the key elapses, in step 355, the server rotates the keys. The active key becomes the old key and a new key becomes the active key and the active key is sent to the client. This process continues indefinitely until, in step 360, the client sends a message, via a finished packet, to inform the server that it has completed sending packets. In step 365 the server sends an acknowledgement and the communication is terminated.

Figure 4:
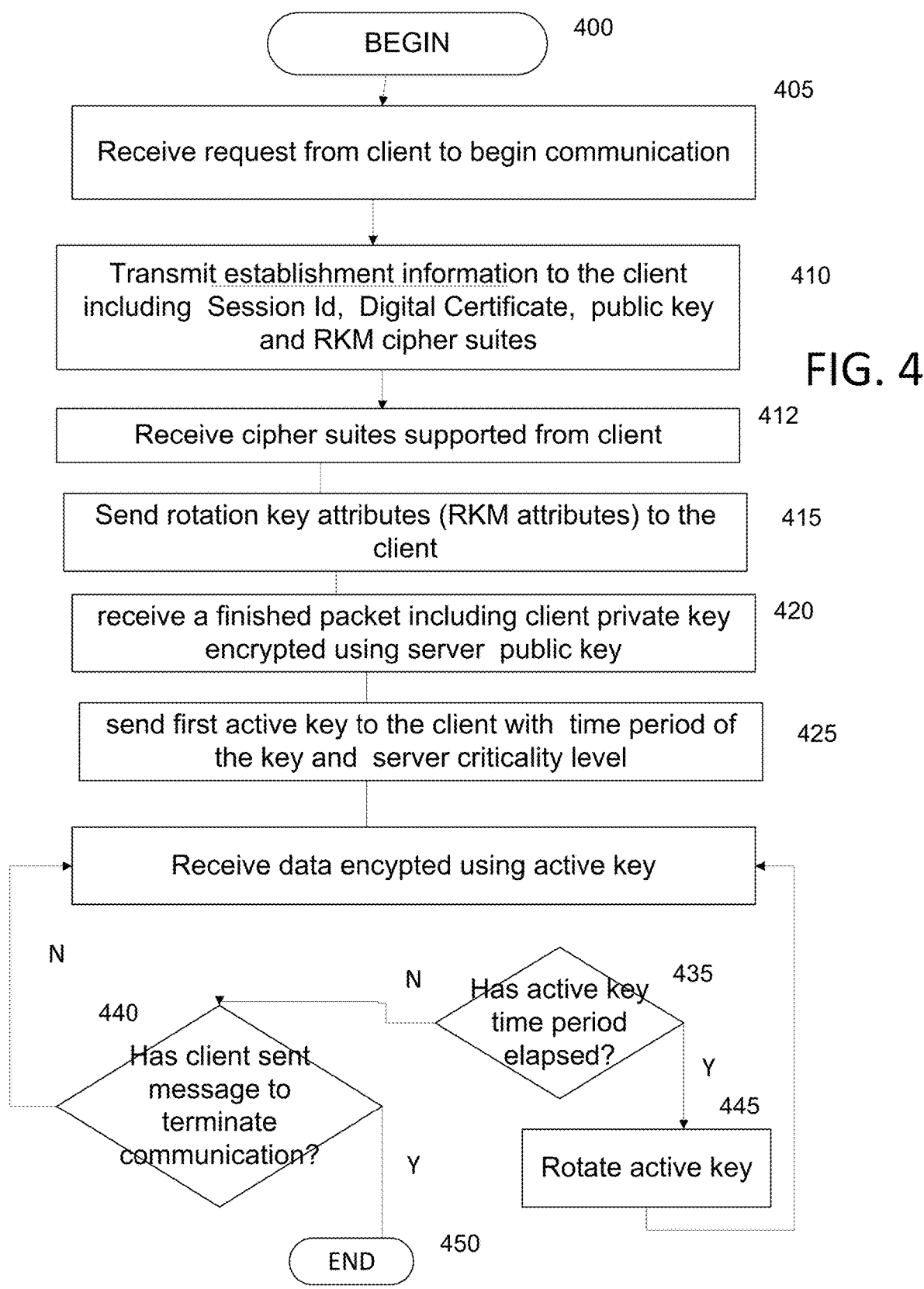
FIG. 4 is an example flow chart of execution of the rotating key protocol according to the present disclosure by a server.

The protocol described above includes tasks shared by the client and server. FIG. 4 is a flow chart of the performance of the rotating key mechanism protocol by the server according to an embodiment of the present disclosure. In step 400 the method begins. In a first step 405, the server receives a request from a client to initiate communication. In step 410, the server transmits information ("establishment information") to the client including a session id, a digital certificate, a public key and cipher suites support for the rotation key mechanism. Once verified, the server receives cipher suites selected by the client. In a following step 415, the server sends rotation key attributes (RKM attributes) to the client. In step 420, the server receives a finished packet from the client including the client's private key encrypted using the server's public key. In step 425 the server sends the first active key to the client, the time period of the key and the server criticality (critical, important, medium, and low). The server then receives packets from the client encrypted using the active key in step 430. In step 435 it is determined whether the key rotation time period has elapsed, if it has not but the server receives a message to end communication from the client, the method ends in step 450. If the rotation time period has elapsed, in step 440 the server sends the client the next cryptographic key in a rotation from the current active key (which become the old key) to the new cryptographic key (which becomes the active key) and disqualifies the previous active key, which is no longer used for communication. The method then cycles back to step 430.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method of establishing secure communication between a client and a server using a rotating key mechanism, the method comprising:
   receiving a message requesting communication from a client;
   returning information for establishing communication to the client, including a set of cipher suites supported;
   receiving from the client one or more selected cipher suites from the set of cipher suites;
   sending rotation key mechanism attributes (RKM attributes) including a number of keys for rotation in a communication session, a valid time period for each key, and a server criticality level; and
   establishing an electronic data communication session between the client and server based on the rotation key mechanism attributes;
   wherein the RKM attributes establish terms for key rotation when a valid time period of an active key elapses.

2. The method of claim 1 further comprising:
   after establishing the electronic data communication session, sending a first active key to the client with the valid time period of the active key and the server criticality level.

3. The method of claim 2, further comprising:
   determining whether the valid time period of the active key has elapsed; and
   rotating the active key to a new cryptographic key if the valid time period has elapsed.

4. The method of claim 1, further comprising:
   reducing the valid time period when the server criticality level is above a threshold value.

5. The method of claim 1, wherein the information for establishing communication further includes a session ID, a digital certification and a public key of the server.

6. A non-transitory computer-readable medium storing a communication relay program including instructions that, when executed by a processor, causes a server device to:
   receive a message requesting communication from a client;
   return information for establishing communication to the client, including a set of cipher suites supported;
   receive from the client one or more selected cipher suites from the set of cipher suites;
   send rotation key mechanism attributes (RKM attributes) including a number of keys for rotation in a communication session, a valid time period for each key, and a server criticality level; and
   establish an electronic data communication session between the client and server based on the rotation key mechanism attributes.

7. The non-transitory computer-readable medium of claim 6, further including instructions that, when executed by a processor, cause a server device to:
   after establishing communication, sending a first active key to the client with the valid time period of the active key and the server criticality level.

8. The non-transitory computer-readable medium of claim 7, further including instructions that, when executed by a processor, cause a server device to:
   determining whether the valid time period of the active key has elapsed; and
   rotating the active key to a new cryptographic key if the valid time period has elapsed.

9. The non-transitory computer-readable medium of claim 6, further including instructions that, when executed by a processor, cause a server device to reduce the valid time period when the server criticality level is above a threshold value.

10. The non-transitory computer-readable medium of claim 6, wherein the information for establishing communication further includes a session ID, a digital certification and a public key of the server.

11. A method of establishing secure communication between a client and a server using a rotating key mechanism, the method comprising:
    receiving a message requesting communication from a client;
    returning information for establishing communication to the client, including a set of cipher suites supported;
    receiving from the client one or more selected cipher suites from the set of cipher suites;
    sending rotation key mechanism attributes (RKM attributes) including a number of keys for rotation in a communication session, a valid time period for each key, and a server criticality level;
    establishing an electronic data communication session between the client and server based on the rotation key mechanism attributes; and
    after establishing the electronic data communication session, sending a first active key to the client with the valid time period of the active key and the server criticality level;
    wherein the RKM attributes establish terms for key rotation when a valid time period of an active key elapses.

* * * * *